United States Patent
Park

(10) Patent No.: US 10,674,824 B2
(45) Date of Patent: Jun. 9, 2020

(54) APPARATUS FOR CONTROLLING MOTION AND METHOD THEREOF

(71) Applicant: ELECTRONICS AND TELECOMMUNICATIONS RESEARCH INSTITUTE, Daejeon (KR)

(72) Inventor: Sangwook Park, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 77 days.

(21) Appl. No.: 16/035,499

(22) Filed: Jul. 13, 2018

(65) Prior Publication Data

US 2019/0014904 A1 Jan. 17, 2019

(30) Foreign Application Priority Data

Jul. 14, 2017 (KR) .................. 10-2017-0089632
Jul. 13, 2018 (KR) .................. 10-2018-0081778

(51) Int. Cl.
| | |
|---|---|
| A47C 1/12 | (2006.01) |
| A63G 31/16 | (2006.01) |
| A63J 25/00 | (2009.01) |
| G06F 3/038 | (2013.01) |
| G06F 3/02 | (2006.01) |
| A63J 5/00 | (2006.01) |
| G06F 3/01 | (2006.01) |

(52) U.S. Cl.
CPC ............... *A47C 1/12* (2013.01); *A63G 31/16* (2013.01); *A63J 25/00* (2013.01); *G06F 3/0202* (2013.01); *G06F 3/038* (2013.01); *A63J 2005/002* (2013.01); *G06F 3/016* (2013.01)

(58) Field of Classification Search
CPC ........ A63G 31/00; A63G 31/02; A63G 31/04; A63G 31/16; A63G 25/00; A47C 1/00; A47C 1/12; G08C 19/00; G06N 5/047; G06N 99/005
USPC .......... 472/59–61, 130; 434/29, 55; 463/1, 7
See application file for complete search history.

(56) References Cited

U.S. PATENT DOCUMENTS

| | | | |
|---|---|---|---|
| 10,315,125 B2* | 6/2019 | Kwon ............. | A47C 1/12 |
| 2015/0157951 A1* | 6/2015 | Lee ............... | A63G 31/16 |
| | | | 472/130 |
| 2015/0324701 A1 | 11/2015 | Park et al. | |
| 2016/0182771 A1 | 6/2016 | Oh | |
| 2018/0117491 A1 | 5/2018 | Kwon et al. | |

FOREIGN PATENT DOCUMENTS

| | | |
|---|---|---|
| KR | 20130067839 A | 6/2013 |
| KR | 101718137 B1 | 3/2017 |
| KR | 101734520 B1 | 5/2017 |
| KR | 101774391 B1 | 9/2017 |

* cited by examiner

*Primary Examiner* — Kien T Nguyen

(57) ABSTRACT

In the present invention, by providing a motion control apparatus comprising an input interface configured to obtain a motion control input, a pattern selector configured to select at least one similar motion pattern corresponding to the motion control input from a plurality of predefined motion patterns, and a motion controller configured to control a seat on which the viewer sits based on the at least one similar motion pattern, the time and cost for providing realistic effect are reduced.

20 Claims, 13 Drawing Sheets

APPARATUS FOR CONTROLLING MOTION AND METHOD THEREOF

CROSS-REFERENCE TO RELATED APPLICATION

This application claims priority to and the benefit of Korean Patent Application Nos. 10-2017-0089632 and 10-2018-0081778 filed in the Korean Intellectual Property Office on Jul. 14, 2017 and Jul. 13, 2018, the entire contents of which are incorporated herein by reference.

BACKGROUND OF THE INVENTION (a) Field of the Invention

The present invention relates to an apparatus for controlling motion and a method thereof.

(b) DESCRIPTION OF THE RELATED ART

Recently, in a 4D (four-dimensional) movie theater, when multimedia contents are displayed through video devices and audio devices, a new dimensional effect is provided to viewers in addition to the conventional audiovisual effect. Based on the new dimensional effect, the viewers can immerse themselves in the multimedia contents.

In this regard, there is a motion device control technology that provides the viewers with the same immersion feelings as if the viewer directly participated in the multimedia contents being watched.

A 4D effect can be generated by a manual authoring method in which a technician manually inputs the 4D effect according to situations in images. Alternatively, a 4D effect automatic extraction technique in which the 4D effect is automatically generated by automatically analyzing an image exists.

However, it takes a lot of manpower and a lot of time to create the 4D effect that has a high sense of immersion and high realistic effects.

Particularly, in the case of the manual authoring method described above, depending on the senses of the technician, a question of general versatility of the 4D effect can be raised. In addition, the 4D effect automatic extraction technique has a problem that a lot of time and costs are required in the rendering operation of extracting the 4D effect by analyzing the image.

SUMMARY OF THE INVENTION

Embodiments of the present invention are provided to control motions of seats faster and simpler than the conventional techniques described above, and ultimately to more easily provide a realistic effect to the viewers.

An exemplary embodiment of the present invention provides a motion control apparatus for providing a realistic effect to a viewer of multimedia contents, comprising: an input interface configured to obtain a motion control input; a pattern selector configured to select at least one similar motion pattern corresponding to the motion control input from a plurality of predefined motion patterns; and a motion controller configured to control a seat on which the viewer sits based on the at least one similar motion pattern.

The apparatus may further comprise conversion point determining interface configured to convert the motion control input into conversion point data based on the conversion point, and wherein the pattern selector selects the at least one similar motion pattern based on the conversion point data.

The pattern selector selects the at least one similar motion pattern using a plurality of pattern codes including a condition for each of the plurality of motion patterns.

The pattern selector selects the at least one similar motion pattern using a plurality of pattern formulas each defining the plurality of motion patterns.

The pattern selector compares the motion control input on current frame of the multimedia content with the plurality of pattern formulas and selects at least one motion pattern having a match rate with the motion control input equal to or greater than a threshold value as the at least one similar motion pattern.

The pattern selector selects a first candidate motion pattern of a first section of entire frame sections of the multimedia content, and a second candidate motion pattern of a second section of the entire frame sections as the at least one similar motion pattern.

The pattern selector selects a third candidate motion pattern of a third section of the entire frame sections and a fourth candidate motion pattern of a fourth section overlapping the third section as a candidate motion pattern, and selects a candidate motion pattern having a higher matching rate with the motion control input among the third candidate motion pattern and the fourth candidate motion pattern as the at least one similar motion pattern.

The plurality of motion patterns include a plurality of first patterns defining a linear motion and tilting of the chair and a plurality of second patterns including at least a portion of the plurality of first patterns.

The plurality of motion patterns includes a movement pattern for linearly controlling the chair or an tilting pattern for tilting the chair on a fixed position.

The plurality of motion patterns include a shaking pattern, a waving pattern, a turning pattern, a rotating pattern, or a collision pattern.

An exemplary embodiment of the present invention provides a motion control method for providing a realistic effect to a viewer of multimedia contents, comprising obtaining a motion control input; dividing the motion control input into conversion point data based on the conversion point; selecting at least one similar motion pattern corresponding to the conversion point data from a plurality of predefined motion patterns; and controlling a seat on which the viewer sits based on the at least one similar motion pattern.

Selecting at least one similar motion pattern includes selecting the at to least one similar motion pattern using a plurality of pattern codes including a condition for each of the plurality of motion patterns.

Selecting at least one similar motion pattern includes selecting the at least one similar motion pattern using a plurality of pattern formulas each defining the plurality of motion patterns.

Selecting the at least one similar motion pattern using a plurality of pattern formulas includes comparing the motion control input on current frame of the multimedia content with the plurality of pattern formulas, and selecting at least one motion pattern having a match rate with the motion control input equal to or greater than a threshold value as the at least one similar motion pattern.

Selecting at least one similar motion pattern includes selecting a first candidate motion pattern of a first section of entire frame sections of the multimedia content, and a second candidate motion pattern of a second section of the entire frame sections as the at least one similar motion pattern.

Selecting at least one similar motion pattern includes selecting a third candidate motion pattern of a third section of the entire frame sections and a fourth candidate motion pattern of a fourth section overlapping the third section as a candidate motion pattern, and selecting a candidate motion pattern having a higher matching rate with the motion control input among the third candidate motion pattern and the fourth candidate motion pattern as the at least one similar motion pattern.

The plurality of motion patterns include a plurality of first patterns defining a linear motion and tilting of the chair and a plurality of second patterns including at least a portion of the plurality of first patterns.

The plurality of first patterns includes a movement pattern for linearly controlling the chair or an tilting pattern for tilting the chair on a fixed position.

The plurality of second patterns include a shaking pattern, a waving pattern, a turning pattern, a rotating pattern, or a collision pattern.

An exemplary embodiment of the present invention provides A motion control apparatus for providing a realistic effect to a viewer of multimedia contents, comprising an input interface configured to obtain a motion control input including an x-axis input, a y-axis input, a z-axis input, a roll input, a yaw input, and a pitch input for controlling a locus of a chair on which the viewer is seated; a pattern selector configured to select at least one similar motion pattern corresponding to the motion control input from a plurality of predefined motion patterns; and a motion controller configured to control a seat on which the viewer sits based on the at least one similar motion pattern.

DETAILED DESCRIPTION OF THE EMBODIMENTS

Figure 1:
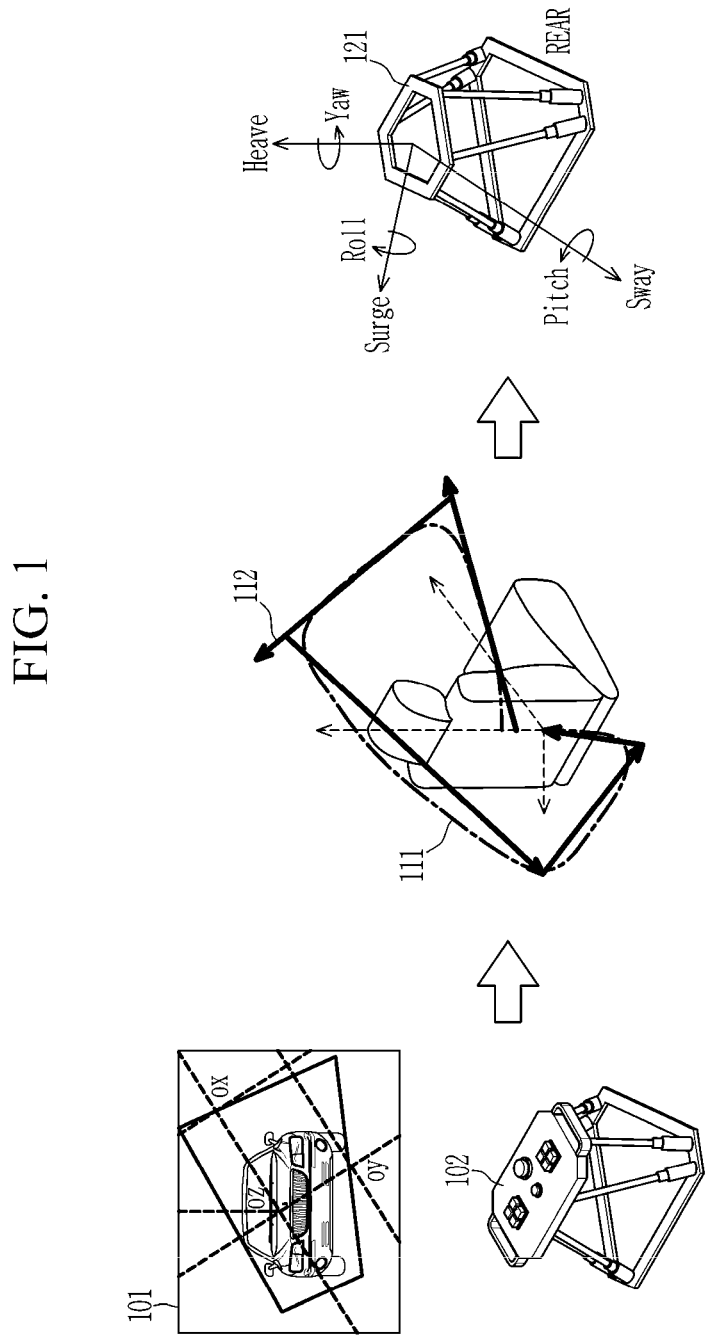
FIG. 1 shows a motion control method according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive, and like reference numerals designate like elements throughout the specification.

FIG. 1 shows a motion control method according to an embodiment of the present invention.

As shown in FIG. 1, according to an embodiment of the present invention, the motion control device obtains the motion control input 111 from the outside 101, 102 through the input interface, simplifies 112 the motion control input 111, The motion controller 121 can provide a sensation effect to the viewer of the multimedia contents based on the motion picture 112.

The realistic effect refers to the effect according to sense that the viewer of the multimedia contents directly experiences the multimedia contents.

The input of the motion control device may obtain the motion control inputs 101, 102.

The motion control input may define the locus of the chair in which the viewer is seated.

For one example, the motion control input may include an automatic motion control input 101 that is calculated based on a result of analyzing a motion or a trajectory of a specific object in the image to be provided to the user with the motion control.

For another example, the motion control input may include a manual motion control input 102 that is manually input via an input device 102 of the same type as the motion controller 121.

The motion control apparatus may simplify the motion control input 111 for controlling the motion control unit 121 for each frame of the image into a set of at least one predefined motion pattern.

The motion control device provides the image and simultaneously to outputs the motion control unit 121 in the x-axis direction (Sway), the direction of rotation about the x-axis (Pitch), the y direction (Surge), the direction of rotation about the y-axis (Yaw), the z axis direction (Heave), and the direction of rotation about the z-axis (Roll).

Figure 2:
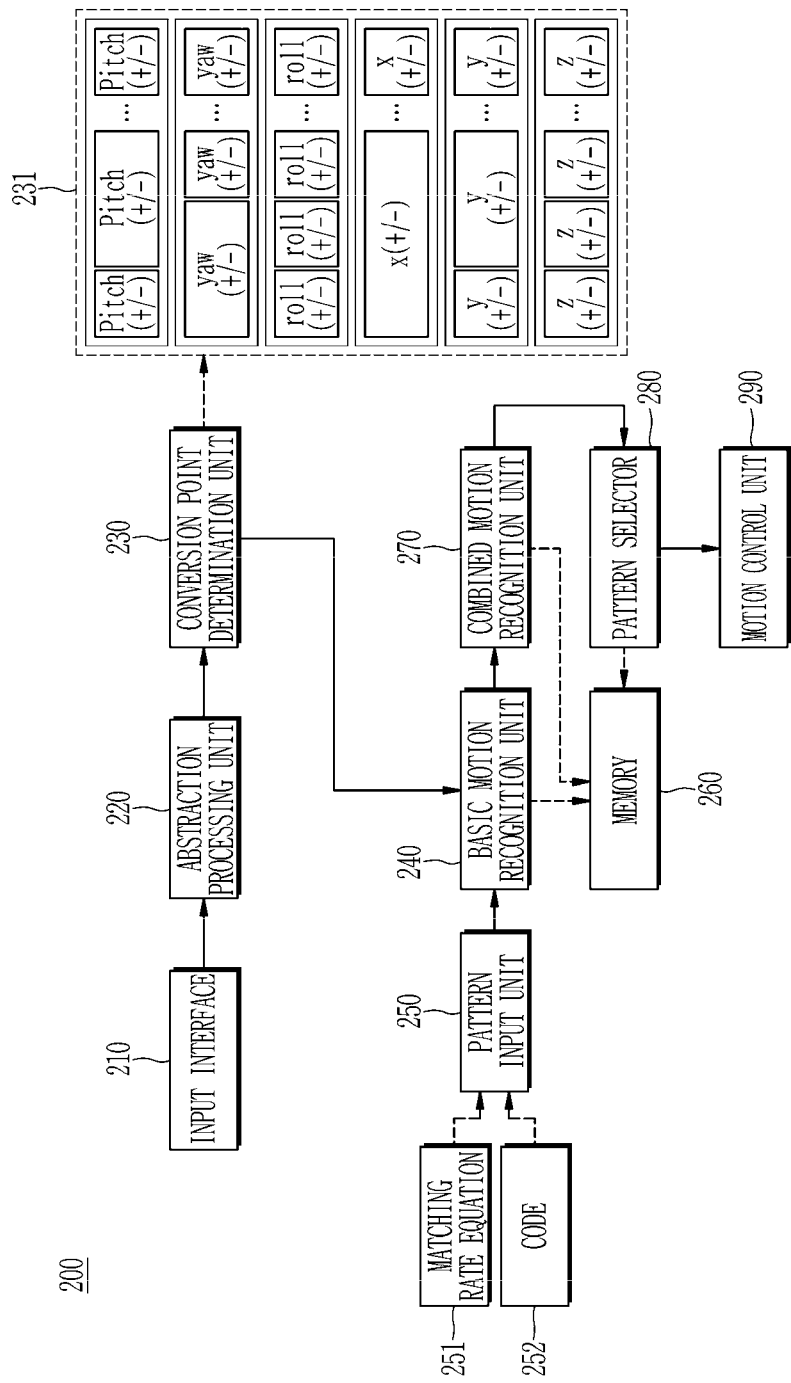
FIG. 2 shows a motion control device according to an embodiment of the invention.

FIG. 2 shows a motion control device according to an embodiment of the invention.

As shown in FIG. 2, according to an embodiment of the present invention, the motion control apparatus 200 includes an input interface 210, an abstraction processing unit 220, a conversion point determination unit 230, a pattern input unit 250, a basic motion recognition unit 240, a memory 260, a combined motion recognition unit 270, a pattern selector 280, and a motion control unit 290.

The input interface 210 may receive a motion control input corresponding to an image, and the motion control input may include the automatic motion control input 101 or the manual motion control input 102 described with reference to FIG. 1.

The abstraction processing unit 210 may remove noise from the received motion control input.

The conversion point determination unit 230 generates conversion point data 231 of six dimensions having the same format as the predefined patterns by applying a constant parameter (e.g., increase parameter or decrease parameter) to the noise-removed motion control input can do.

For example, the conversion point determination unit 230 divides the noise-removed motion control input into motion control inputs in six directions such as an x-axis direction, y-axis direction, z-axis direction, a pitch direction, a roll direction, and a yaw direction.

The conversion point determination unit 230 analyzes the six-dimensional motion control input, identifies a conversion point where a change in the input value in each dimension becomes zero and generates conversion point data 241 including a direction information (increase (+) or decrease (−) based on the conversion point).

The pattern input unit 250 may transmit the matching rate equation 251 and a pattern code 252 corresponding to the predefined motion patterns to the basic motion recognition unit.

For example, the matching rate equation 251 may be a mathematical expression representing each of the predefined motion patterns.

For example, the pattern code 252 may be a predefined condition (e.g., a derivative of x, y, z is 0) to determine that the motion control input matches predefined motion patterns.

The matching rate equation 251 and the pattern code 252 may be stored in the memory 260 or may be acquired from the outside by the pattern input unit 250.

The basic motion recognition unit 240 may select at least one basic motion pattern for controlling motion based on a result of comparing the basic motion patterns and the conversion point data 231 among predefined motion patterns.

For example, The basic motion recognizing unit 240 selects at least one basic motion patterns, having matching rate to the conversion point data 231, larger than a threshold value, among predetermined basic motion patterns, using the patterns code 252 and the matching rate equation 251 corresponding to the predetermined basic motion patterns, and store the selected at least one basic motion patterns in the memory 260.

The combined motion recognition unit 280 selects at least one combined motion pattern based on a result of comparing the conversion point data 231 with predefined combined motion patterns of predefined motion patterns, and stores the selected at least one combined motion patterns in memory 260.

The pattern selection unit 280 can select similar motion patterns having the highest matching rate with the conversion point data 231, using the matching rate equation 251, at least one stored basic motion patterns, and at least one stored combined motion patterns.

For example, the similar motion patterns may include at least one basic motion patterns and/or at least one combined motion pattern.

The motion controller 290 can provide the realistic effect by controlling the motion of the chair in which the viewer sits using the selected similar motion patterns.

Figure 3:
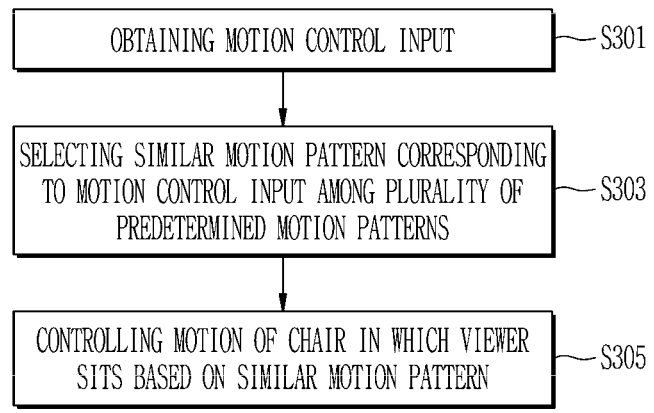
FIG. 3 shows a motion control method according to an embodiment of the present invention.

FIG. 3 shows a motion control method according to an embodiment of the present invention.

As shown in FIG. 3, according to an embodiment of the present invention, in operation S301, the motion control device can obtain a motion control input.

For example, the motion control device may receive the automatic motion control input 101 or the manual motion control input 102.

When the motion control input is obtained, in operation S303, the motion control device may select at least one similar motion pattern from a plurality of to predefined motion patterns corresponding to the motion control input.

For example, the motion control device may select predefined basic motion patterns and/or composite motion patterns whose match rate with the motion control input is above a threshold.

When the basic and/or composite motion patterns are selected, at operation S305, the motion control device may control the motion of a chair in which the viewer sits using the selected basic and/or composite motion patterns.

Figure 4:
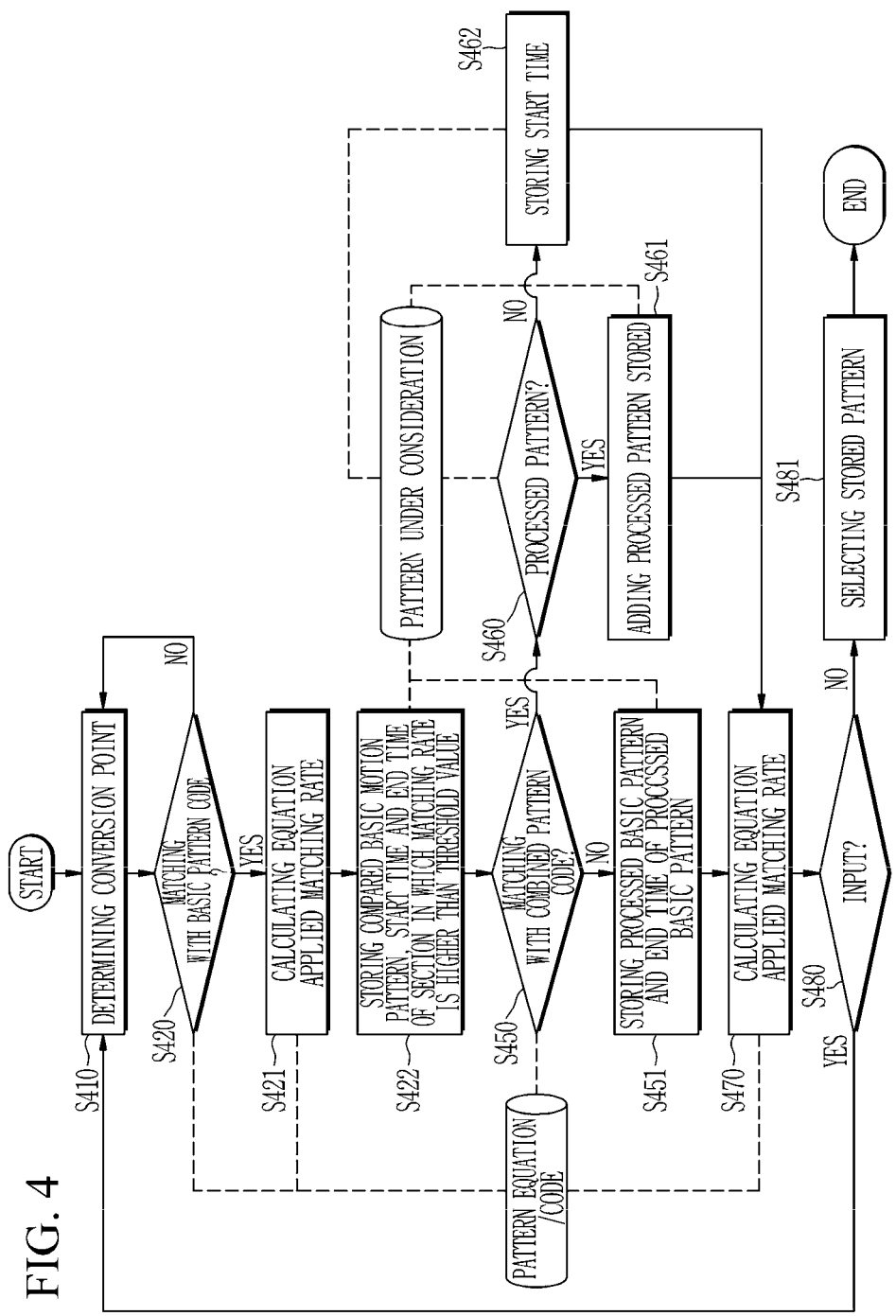
FIG. 4 shows a motion control method according to an embodiment of the present invention.

FIG. 4 shows a motion control method according to an embodiment of the present invention.

As shown in FIG. 4, according to one embodiment of the present invention, in operation S410, the motion control device may obtain a motion control input and determine a point of conversion of the motion control input at the current point in time (frame).

In operation S420, the motion control device determines whether or not the conversion point data (x, y, z, yaw, pitch, roll) in the current frame matches a pattern code corresponding to the basic motion pattern among a plurality of previously stored pattern codes.

For example, when the differential value of the x, y, and z values of the conversion point data is 0, the conversion point data matches the pattern code of the movement pattern (moving in a specific direction) of the basic motion patterns (the derivative of x, y, z is zero).

When it is determined that the conversion point data does not match with the pattern code corresponding to the basic motion pattern, the motion control to device repeats operation S410.

When it is determined that the conversion point data matches the pattern code corresponding to the basic motion pattern, the motion control device calculates the matching rate of the basic motion pattern corresponding to the pattern code matching with the conversion point data in operation S421.

For example, the motion control device compares the conversion point data with pattern data that is predefined by a predefined pattern equation in relation to the basic motion pattern.

The motion control device calculates the matching rate between the conversion point data and the pattern data using the result of comparing the conversion point data and the pattern data.

In operation S422, the motion control apparatus stores the compared basic motion pattern, and the start time and the end time of the section in which the matching rate of the conversion point data with the pattern data is higher than the threshold value in the memory as "pattern under consideration" (candidate motion pattern), by using the calculated result.

For example, the motion control device can store a single basic motion pattern and a plurality of basic motion patterns in memory as "pattern under consideration".

For example, the motion control apparatus can store both a movement pattern having a specific start time and a specific end time and an tilting pattern having the same start time and end time same as "pattern under consideration".

In operation S450, the motion control device determines whether or not the conversion point data in the current frame matches the combined pattern code corresponding to the combined motion pattern.

When the conversion point data does not match with the combined pattern code as a result of the determination, in step S451, the motion control device designates the ending time of the basic motion pattern and the basic motion pattern that are in progress (stored as "pattern under consideration") and store in memory.

If the conversion point data matches the combined pattern code as a result of the determination, in operation S460, the motion control device determines whether the combined motion pattern corresponding to the combined pattern code matching the conversion point data is a progressing pattern.

If it is determined that the combined motion pattern is not a progressing pattern, in step S462, the motion control device may designates the start time of the combined motion pattern and the combined motion pattern as a "pattern under consideration", and stores in the memory.

If it is determined that the combined motion pattern is a progressing pattern, in step S461, the motion control apparatus can add the combined motion pattern to the existing progressing pattern.

In operation S470, the motion control device may calculate a matching rate between at least one "under consideration pattern" that has been stored so far and the conversion point data up to the present frame, using the pattern formula of at least one "under consideration pattern".

In operation S480, the motion control device determines whether a new motion control input is present.

TABLE 1

| Order | Start time | Duration | Frame | Parameter | Data | | | | | |
|---|---|---|---|---|---|---|---|---|---|---|
| 1 | S | D | N | 6 | Index | 1 | 2 | 3 | ... | N |
| | | | | | x | 1 | 2 | 3 | ... | 10 |
| | | | | | y | 11 | 12 | 13 | ... | 20 |
| | | | | | z | 21 | 22 | 23 | ... | 30 |
| | | | | | Pitch | 10 | 20 | 30 | ... | 100 |
| | | | | | Yaw | 110 | 120 | 130 | ... | 200 |
| | | | | | Roll | 210 | 220 | 230 | ... | 300 |

The motion control input has the order of "Order (1)", starts at "Start time (S)", is input for "Duration (for example, D)", is input repeatedly as many as the number of "Frame (N)", having data of dimension as many as "Parameter (6)", and have x, y, z, Pitch, Yaw, and Roll values for each Index (1, 2, 3, . . . , N) (Frame Number).

The basic motion pattern and the combined motion pattern according to the embodiment of the present invention can be predefined as shown in Table 2 below.

TABLE 2

| Order | Name | Description | Code | Property |
|---|---|---|---|---|
| 1 | moving (basic) | moving in specific direction | differential value of x, y, z is 0 | vertical angle, horizontal angle, distance, velocity, acceleration, moving range |
| 2 | tilting (basic) | tilting in specific angle | differential value Pitch/Yaw/Roll is 0 | direction, velocity, acceleration, moving range |
| 3 | shaking (combined) | shaking in specific direction | repeating moving pattern on + direction and − direction | direction, distance, duration, count, moving range |
| 4 | waving (combined) | moving like waving | repeating moving pattern and tilting pattern on constant duration and moving repeatedly on + direction and − direction | duration, distance, direction, start direction, count, moving range |
| 5 | rotating (combined) | repeat moving curvy | repeating moving pattern and tilting pattern on constant duration | direction, count, interval |
| 6 | turning (combined) | moving curvy toward | moving pattern and tilting pattern on constant duration | direction, velocity, distance |
| 7 | collision (combined) | collision with specific object | moving on same direction of tilting pattern and on orthogonal direction of moving pattern | vertical angle, horizontal angle, velocity, up/down, left/right, front/back |

If it is determined that there is a new motion control input, the motion control device performs operation S410.

If it is determined that there is no new motion control input, in step S481, the motion control device selects a similar motion pattern having the highest matching rate among the at least one "pattern under consideration" stored so far, based on the matching rate of at least one "under consideration pattern" with the conversion point data up to the present frame.

When the operation S481 is performed, the motion control device can control the motion of the chair where the viewer is seated based on the selected similar motion pattern.

Figure 5:
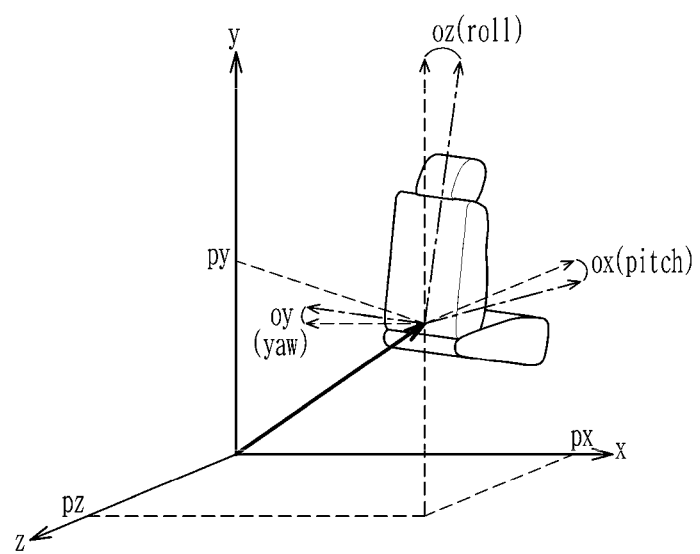
FIG. 5 shows a motion control input according to an embodiment of the present invention.

FIG. 5 shows a motion control input according to an embodiment of the present invention.

As shown in FIG. 5, each data of the motion control input is reflected in the motion direction control data (ox, oy, oz) and rotating direction control data (pitch, yaw, roll) in the motion device in the basic position (px, py, pz) can do.

Examples of motion control inputs according to embodiments of the present invention are shown in Table 1 below.

The basic motion pattern and the combined motion pattern are represented by the order of each pattern, the name of each pattern, the description of each pattern, the pattern code which is a condition for the conversion point data to be recognized as a pattern.

Hereinafter, the basic motion pattern and the combined motion pattern will be described with reference to FIGS. 6 to 12.

Each of the patterns described with reference to FIGS. 6 to 12 defines a motion property and a pattern property, and a number of frames (length) and a duration are respectively defined as motion properties.

Commonly, the output variable i can mean a frame index between 0 and length.

The initial position of the pattern can be defined as $x^0$, $y^0$, $z^0$, $pitch^0$, $yaw^0$ and $roll^0$.

Figure 6:
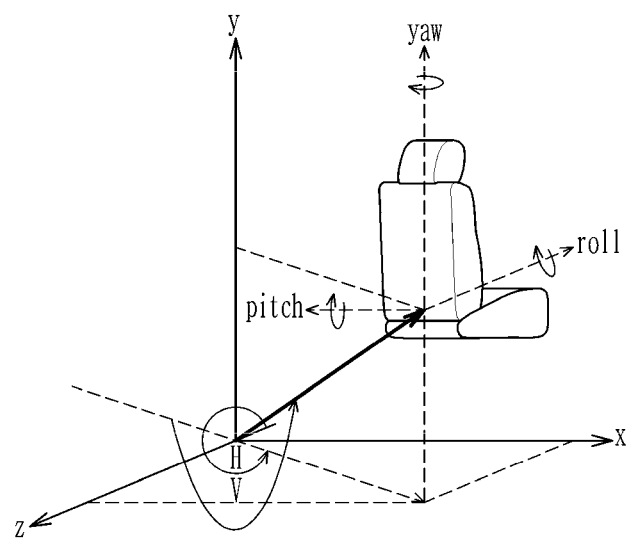
FIG. 6 shows a movement pattern according to an embodiment of the present invention.

FIG. 6 shows a movement pattern according to an embodiment of the present invention.

As shown in FIG. 6, the movement pattern may be a motion pattern for providing the user with a feeling of moving or flying at a vertical angle and a horizontal angle at the current position.

The pattern property of the movement pattern may include a vertical angle (V), a horizontal angle (H), a distance, and a speed.

The moving distance on the frame i ($daf^i$) according to the movement pattern is defined by Equation 1 below.

$$daf^i = i* \left( \frac{speed}{length} * duration \text{ or } \frac{distance}{length} \right) \quad [\text{Equation 1}]$$

The x, y, z, pitch, yaw, and roll according to the movement pattern are defined by Equation 2 to Equation 7 below.

$$x^i = x^0 + daf^i/\cos V/\cos H \quad [\text{Equation 2}]$$

$$y^i = y^0 + daf^i * \sin H/\cos V \quad [\text{Equation 3}]$$

$$z^i = z^0 + daf^i * \sin V \quad [\text{Equation 4}]$$

$$pitch^i = pitch^{i-1}, \quad [\text{Equation 5}]$$

$$yaw^i = yaw^{i-1} \quad [\text{Equation 6}]$$

$$roll^i = roll^{i-1} \quad [\text{Equation 7}]$$

Figure 7:
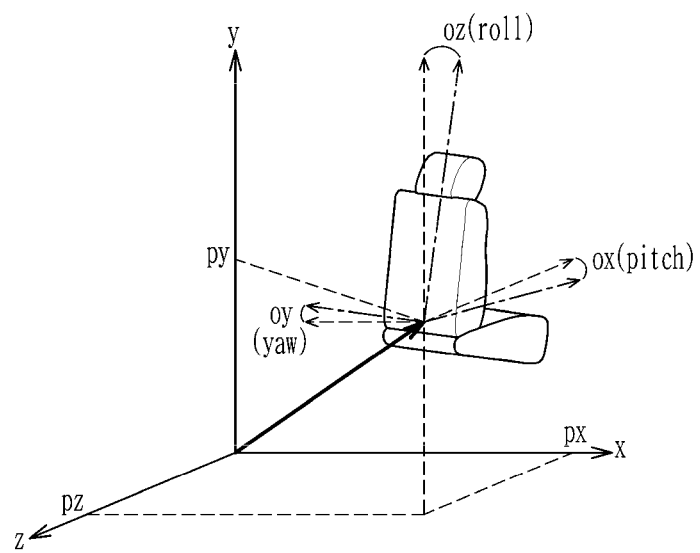
FIG. 7 shows an tilting pattern according to an embodiment of the present invention.

FIG. 7 shows an tilting pattern according to an embodiment of the present invention.

As shown in FIG. 7, the position of the motion device does not change according to the tilt pattern, and the angular values of the x-axis, y-axis, and z-axis change at constant velocity at every frame up to the target angle and/or and may be maintained for the indicated time.

The pattern property of the tilting pattern may include direction (angle (pitch or yaw or roll)) and speed.

The angle per frame (apf) according to the tilting pattern is defined as Equation 8 below.

$$apf^{pitch\ yaw\ roll} = \left( \frac{angle - angle^0}{length} \right) \text{ or } \left( \frac{speed*duration - angle^0}{length} \right) \quad [\text{Equation 8}]$$

The x, y, z, pitch, yaw, and roll according to the tilting pattern are defined by Equation 9 to Equation 14 below.

$$x^i = x^{i-1} \quad [\text{Equation 9}]$$

$$y^i = y^{i-1} \quad [\text{Equation 10}]$$

$$z^i = z^{i-1} \quad [\text{Equation 11}]$$

$$pitch^i = pitch^{i-1} + apf^{pitch}, \text{if } pitch^i > pitch; pitch^i = pitch \quad [\text{Equation 12}]$$

$$yaw^i = yaw^{i-1} + apf^{yaw}, \text{if } yaw^i > yaw; yaw^i = yaw \quad [\text{Equation 13}]$$

$$roll^i = roll^{i-1} + apf^{roll}, \text{if } roll^i > roll; roll^i = roll \quad [\text{Equation 14}]$$

Figure 8:
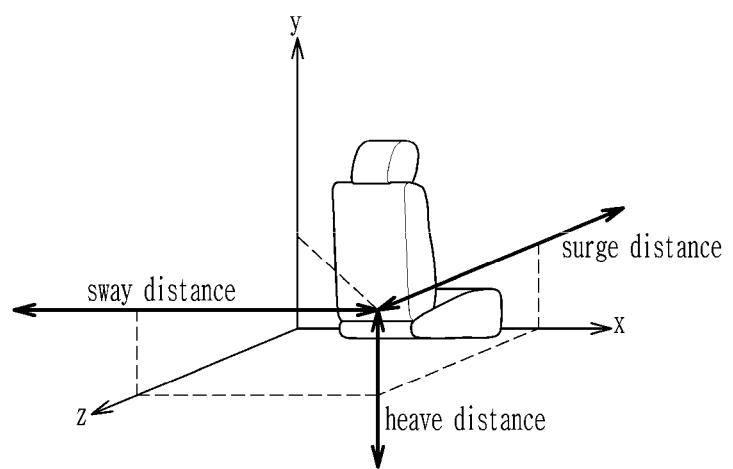
FIG. 8 shows a shaking pattern according to an embodiment of the present invention.

FIG. 8 shows a shaking pattern according to an embodiment of the present invention.

As shown in FIG. 8, the shaking pattern moves the chair every frame by a distance designated in the designated direction.

The pattern attribute of the shaking pattern may include direction (sway, surge, heave), distance, counts, and interval.

The shaking distance at the frame i ($sdaf^i$) according to the shaking pattern can be defined as Equation 15 below.

$$sdaf^i = \frac{distance}{2*length} * \begin{pmatrix} 1 \text{ if } i\ \%\left(\frac{length}{count}\right) = 0 \text{ or } 3 \\ -1 \text{ if } i\ \%\left(\frac{length}{count}\right) = 1 \text{ or } 2 \end{pmatrix} \quad [\text{Equation 15}]$$

The x, y, z, pitch, yaw, and roll according to the shaking pattern are defined by Equation 16 to Equation 21 below.

$$x^i = x^0 + sdaf^i \text{ if direction=sway,else } x^i = x^{i-1} \quad [\text{Equation 16}]$$

$$y^i = y^0 + sdaf^i \text{ if direction=surge,else } y^i = y^{i-1} \quad [\text{Equation 17}]$$

$$z^i = z^0 + sdaf^i \text{ if direction=heave,else } z^i = z^{i-1} \quad [\text{Equation 18}]$$

$$pitch^i = pitch^{i-1} \quad [\text{Equation 19}]$$

$$yaw^i = yaw^{i-1} \quad [\text{Equation 20}]$$

$$roll^i = roll^{i-1} \quad [\text{Equation 21}]$$

Figure 9:
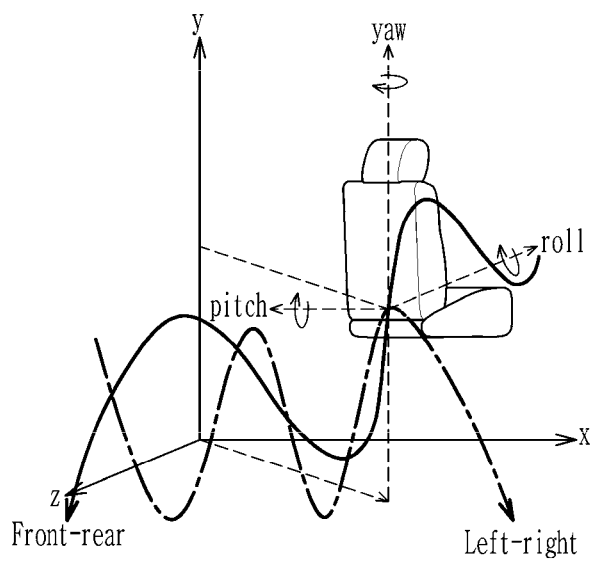
FIG. 9 shows a waving pattern according to an embodiment of the present invention.

FIG. 9 shows a waving pattern according to an embodiment of the present invention.

As shown in FIG. 9, the waving pattern may be a pattern that repeatedly provides the user with periodic moving motion and tilted motion within a certain range periodically.

The pattern properties of the waving pattern can include direction (front-rear, left-right), distance, count, start direction (up, down) and interval.

The waving distance at the frame i ($wdaf^i$) according to the wave pattern can be defined as Equation 22 below.

$$wdaf^i = \frac{distance}{2} * \sin \frac{i*count*\frac{360}{length} \text{ if } sd \text{ UP}}{180 + i*count*\frac{360}{length} \text{ if } sd \text{ DOWN}} \quad [\text{Equation 22}]$$

In Equation 22, sd is the start direction.

The waving angle per frame (wapf) according to the wave pattern can be defined by Equation 23 below.

$$wapf = count * \frac{360}{length} \quad [\text{Equation 23}]$$

The x, y, z, pitch, yaw, and roll along the wave pattern are defined by Equation 24 to Equation 29 below.

$$x^i = x^{i-1} \quad [\text{Equation 24}]$$

$$y^i = y^0 + wdaf^i \quad [\text{Equation 25}]$$

$$z^i = z^{i-1} \quad [\text{Equation 26}]$$

$$pitch^i = pitch^{MAX} * \cos \frac{i*wapf \text{ if } sd \text{ UP}}{180 + i*wapf \text{ if } sd \text{ DOWN}} \quad [\text{Equation 27}]$$

if direction = front − rear $$yaw^i = yaw^{i-1} \quad [\text{Equation 28}]$$

$$roll^i = roll^{MAX} * \cos \frac{i*wapf \text{ if } sd \text{ UP}}{180 + i*wapf \text{ if } sd \text{ DOWN}} \quad [\text{Equation 29}]$$

if direction = left − right

Figure 10:
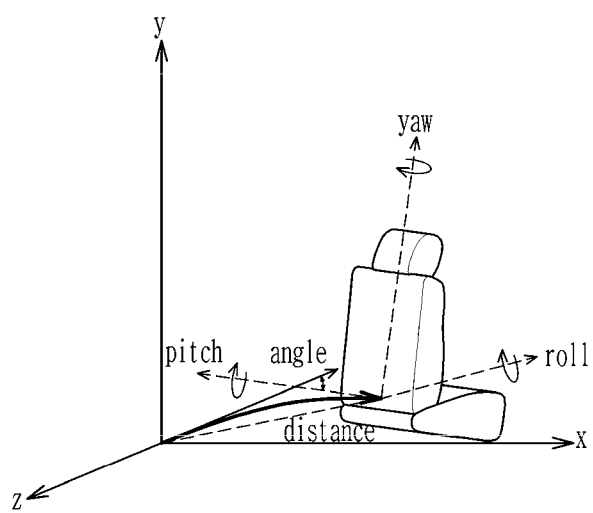
FIG. 10 shows a turning pattern according to an embodiment of the present invention.

FIG. 10 shows a turning pattern according to an embodiment of the present invention.

As shown in FIG. 10, the turning pattern is a pattern that provides the user a feeling of moving on a certain angle and tilting, so that the vehicle on which the user is riding turns right or left.

The pattern properties of the turning pattern may include pattern, angle, distance, and speed.

The turning distance per frame i ($tdpf^i$) according to the turning pattern is defined by Equation 30 below.

$$tdpf^i = i * \frac{distance}{length} * duration \qquad [\text{Equation 30}]$$

The turning angle per frame (tapf) is defined by Equation 31 below.

$$tapf = \frac{angle}{length} * duration \text{ or } \frac{speed}{length} * duration \qquad [\text{Equation 31}]$$

The x, y, z, pitch, yaw, and roll according to the turning pattern are defined by Equation 32 to Equation 37 below.

$$x^i = x^0 + tdpf^i * \sin(yaw^0 + angle) \qquad [\text{Equation 32}]$$

$$y^i = y^{i-1} \qquad [\text{Equation 33}]$$

$$z^i = z^0 + tdpf^i * \cos(yaw^0 + angle) \qquad [\text{Equation 34}]$$

$$pitch^i = pitch^{i-1} \qquad [\text{Equation 35}]$$

$$roll^i = roll^{i-1} \qquad [\text{Equation 36}]$$

$$yaw^i = yaw^{i-1} + tapf, \text{if } yaw^i > yaw^0 + angle; yaw^i = yaw^0 + angle \qquad [\text{Equation 37}]$$

Figure 11:
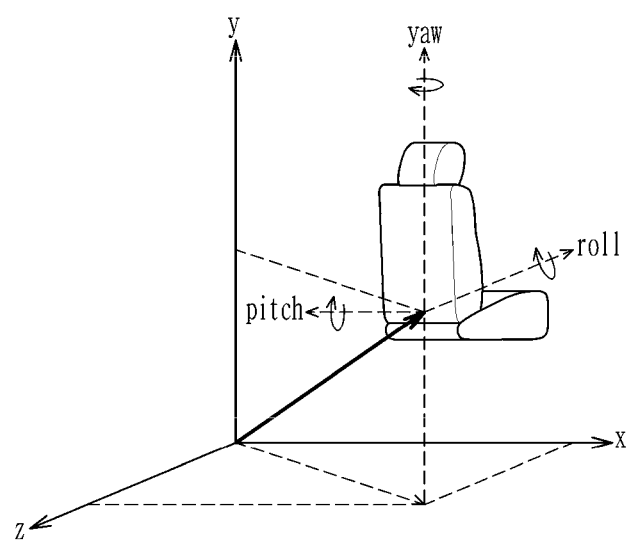
FIG. 11 shows a rotating pattern according to an embodiment of the present invention.

FIG. 11 shows a rotating pattern according to an embodiment of the present invention.

As shown in FIG. 11, the rotation pattern is a motion pattern for providing a user an inclined motion exceeding 360 degrees.

The pattern properties of the rotation pattern may include a direction (xf, xb, yf, yb, zf, zb), a count, and an interval.

The rotation angle per frame (sapf) according to the rotation pattern is defined by Equation 38 below.

$$sapf = length/360 * count \qquad [\text{Equation 38}]$$

The x, y, z, pitch, yaw, and roll according to the rotation pattern are defined by Equation 39 to Equation 44 below.

$$x^i = x^{i-1} \qquad [\text{Equation 39}]$$

$$y^i = y^{i-1} \qquad [\text{Equation 40}]$$

$$z^i = z^{i-1} \qquad [\text{Equation 41}]$$

$$pitch^i = \frac{(pitch^{i-1} + spaf)\%360, \text{ if direction} = xf}{(pitch^{i-1} - spaf)\%360, \text{ if direction} = xb}, \qquad [\text{Equation 42}]$$
$$\text{else } pitch^i = pitch^{i-1}$$

$$yaw^j = \frac{(yaw^{j-1} + spaf)\%360, \text{ if direction} = yf}{(yaw^{i-1}, spaf)\%360, \text{ if direction} = yb}, \qquad [\text{Equation 43}]$$
$$\text{else } yaw^j = yaw^{j-1}$$

$$roll^i = \frac{(roll^{i-1} + spaf)\%360, \text{ if direction} = zf}{(roll^{i-1} - spaf)\%360, \text{ if direction} = zb}, \qquad [\text{Equation 44}]$$
$$\text{else } roll^i = roll^{i-1}$$

Figure 12:
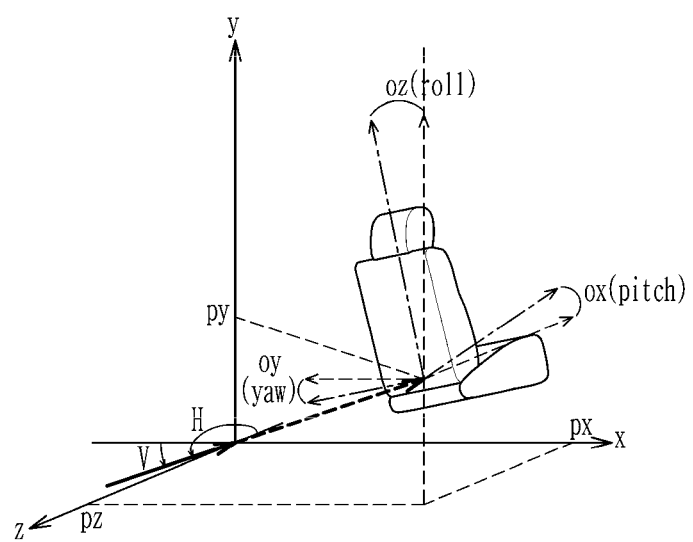
FIG. 12 shows a collision pattern according to an embodiment of the present invention.

FIG. 12 shows a collision pattern according to an embodiment of the present invention.

As shown in FIG. 12, the collision pattern is a pattern for providing a motion to a user as if a specific object is blown and hit, so that a user who is riding on the vehicle is affected by the collision, and may generate an effect that makes the user bounce in the direction of the horizontal angle and the vertical angle of the flying object.

The pattern properties of the collision pattern may include a vertical angle (V), a horizontal angle (H), a speed, and a position (heave, surge, sway).

The collision effected vertical angle (ceva) of the collision motion according to the collision pattern can be defined by Equation 45 below.

ceva=V if −45≤V<45,

V−90 if 45≤V<135,

V−180 if 135≤V<225,

V−270 if 225≤V<315 [Equation 45]

The collision effected horizontal angle (ceva) of the collision motion according to the collision pattern can be defined by Equation 46 below.

ceha=H if −45≤H<45,

H−90 if 45≤H<135

H−180 if 135≤H<225

H−270 if 225≤H<315 [Equation 46]

The collision vertical angle per frame (cvapf) according to the collision pattern can be defined by Equation 47 below.

$$cvapf = \left(\frac{effect\ axis + ceva}{length}\right), \qquad [\text{Equation 47}]$$

if $-45-yaw^\circ < H < 45-yaw^\circ$ or $135-yaw^\circ < H < 225-yaw^\circ$, effectaxis=pitch°, else effectaxis=roll°

The collision horizontal angle per frame (chapf) according to the collision pattern can be defined by Equation 48 below.

$$chapf = \frac{yaw^\circ}{length} + ceha \qquad [\text{Equation 48}]$$

The collision distance at the frame i ($daf^i$) according to the collision pattern can be defined by Equation 49 below.

$$daf^i = i * \left(\frac{speed}{length} * duration \text{ or } \frac{distance}{length}\right) \qquad [\text{Equation 49}]$$

The x, y, z, pitch, yaw, and roll according to the collision pattern are defined by Equation 50 to Equation 55 as follows.

$x^i = x^0 + daf/\cos V/\cos H$ [Equation 50]

$y^i = y^0 + daf*\sin H/\cos V$ [Equation 51]

$z^i = z^0 + daf*\sin V$ [Equation 52]

pitch$^i$=pitch$^{i-1}$+cvapf,if −45−yaw°<H<45−yaw° or 135−yaw°<H<225−yaw° [Equation 53]

yaw$^i$=yaw$^{i-1}$+chapf [Equation 54]

roll$^i$=roll$^{i-1}$+cvapf,if 45−yaw°<H<135−yaw° or 225−yaw°<H<315−yaw° [Equation 55]

Figure 13:
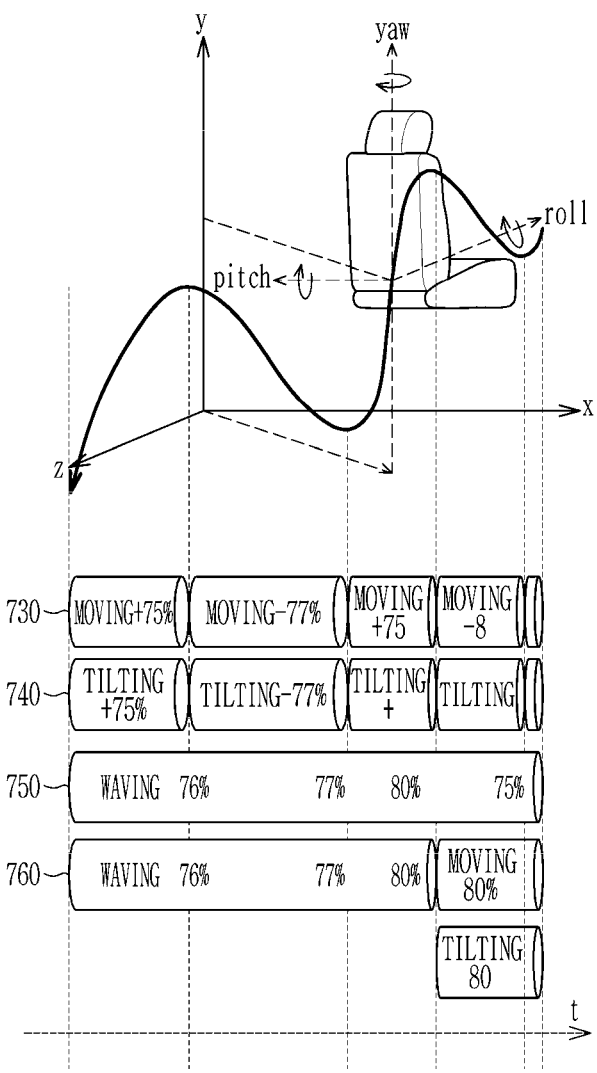
FIG. 13 shows a similar motion pattern selected in accordance with an embodiment of the present invention.

FIG. 13 shows a similar motion pattern selected in accordance with an embodiment of the present invention.

As shown in FIG. 13, for example, the motion control device may select moving patterns 730 and tilting patterns 740 as a similar motion pattern.

In another example, the motion control device may select the waving pattern 750 as a similar motion pattern in the entire section.

In another example, the motion control device may select the waving pattern 750 as a similar motion pattern in a first section among the entire section, and select the moving pattern and the tilting pattern in a second section among the entire section in which the matching rate of the waving pattern 750 and the motion control input is relatively low than the second section, as a similar motion pattern.

The present invention can more easily represent realism through a motion device such as a 4D movie theater or a motion effect simulator (for example, a ride product) by defining a motion pattern and using the most suitable motion pattern among them.

Further, the present invention can easily substitute motion control inputs of various formats input in various ways into predefined motion patterns, thereby reducing the time and cost required to represent reality.

In addition, the present invention can easily replace physical motion equations (e.g., moving changes and tilting changes) that should be applied every frame with frequently used motion patterns.

In addition, the present invention can be applied to a technique of recognizing a standardized motion pattern using big data by defining standardized motion patterns using equations, selecting a part of each standardized motion pattern with a consistent basis, so the readability for the to realistic effect can be improved.

In addition, since the present invention uses a motion pattern having a high compatibility standard, versatility can be extended among motion control systems using data of different formats.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A motion control apparatus for providing a realistic effect to a viewer of multimedia contents, the apparatus comprising:
an input interface configured to obtain a motion control input;
a pattern selector configured to select at least one similar motion pattern similar to the motion control input from a plurality of predefined motion patterns based on a result of comparing the motion control input with the plurality of predefined motion patterns; and
a motion controller configured to control a seat on which the viewer sits based on the at least one similar motion pattern.

2. The apparatus of claim 1, further comprising:
a conversion point determining interface configured to convert the motion control input into conversion point data based on conversion points of the motion control input, and
wherein the pattern selector selects the at least one similar motion pattern based on the conversion point data.

3. The apparatus of claim 1,
wherein the pattern selector selects the at least one similar motion pattern using a plurality of pattern codes including a condition for each of the plurality of predefined motion patterns.

4. The apparatus of claim 1,
wherein the pattern selector selects the at least one similar motion pattern using a plurality of pattern formulas defining the plurality of predefined motion patterns.

5. The apparatus of claim 4,
wherein the pattern selector compares the motion control input on a current frame of the multimedia contents with the plurality of pattern formulas and selects at least one motion pattern having a match rate with the motion control input equal to or greater than a threshold value as the at least one similar motion pattern.

6. The apparatus of claim 1,
wherein the pattern selector selects a first candidate motion pattern of a first section of entire frame sections of the multimedia contents, and a second candidate motion pattern of a second section of the entire frame sections as the at least one similar motion pattern.

7. The apparatus of claim 6,
wherein the pattern selector selects a third candidate motion pattern of a third section of the entire frame sections and a fourth candidate motion pattern of a fourth section overlapping the third section as a candidate motion pattern, and selects a candidate motion pattern having a higher matching rate with the motion control input among the third candidate motion pattern and the fourth candidate motion pattern as the at least one similar motion pattern.

8. The apparatus of claim 1,
wherein the plurality of predefined motion patterns include a plurality of first patterns defining a linear motion and tilting of the chair and a plurality of second patterns including at least a portion of the plurality of first patterns.

9. The apparatus of claim 8,
wherein the plurality of first patterns includes a movement pattern for linearly controlling the chair or an tilting pattern for tilting the chair on a fixed position.

10. The apparatus of claim 9,
wherein the plurality of second patterns include a shaking pattern, a waving pattern, a turning pattern, a rotating pattern, or a collision pattern.

11. A motion control method for providing a realistic effect to a viewer of multimedia contents, the method comprising
obtaining a motion control input;
dividing the motion control input into conversion point data based on conversion points of the motion control input;
comparing the conversion point data with a plurality of predefined motion patterns;

selecting at least one similar motion pattern similar to the motion control input from the plurality of predefined motion patterns based on a result of the comparing; and controlling a seat on which the viewer sits based on the at least one similar motion pattern.

12. The method of claim 11, wherein selecting the at least one similar motion pattern includes:

selecting the at least one similar motion pattern using a plurality of pattern codes including a condition for each of the plurality of predefined motion patterns.

13. The method of claim 11, wherein selecting the at least one similar motion pattern includes:

selecting the at least one similar motion pattern using a plurality of pattern formulas defining the plurality of predefined motion patterns.

14. The method of claim 13, wherein selecting the at least one similar motion pattern using the plurality of pattern formulas includes:

comparing the motion control input on a current frame of the multimedia contents with the plurality of pattern formulas, and selecting at least one motion pattern having a match rate with the motion control input equal to or greater than a threshold value as the at least one similar motion pattern.

15. The method of claim 11, wherein selecting the at least one similar motion pattern includes:

selecting a first candidate motion pattern of a first section of entire frame sections of the multimedia contents, and a second candidate motion pattern of a second section of the entire frame sections as the at least one similar motion pattern.

16. The method of claim 15, wherein selecting the at least one similar motion pattern includes:

selecting a third candidate motion pattern of a third section of the entire frame sections and a fourth candidate motion pattern of a fourth section overlapping the third section as a candidate motion pattern, and selecting a candidate motion pattern having a higher matching rate with the motion control input among the third candidate motion pattern and the fourth candidate motion pattern as the at least one similar motion pattern.

17. The method of claim 11, wherein wherein the plurality of predefined motion patterns include a plurality of first patterns defining a linear motion and tilting of the chair and a plurality of second patterns including at least a portion of the plurality of first patterns.

18. The method of claim 17, wherein wherein the plurality of first patterns includes a movement pattern for linearly controlling the chair or an tilting pattern for tilting the chair on a fixed position.

19. The method of claim 18, wherein wherein the plurality of second patterns include a shaking pattern, a waving pattern, a turning pattern, a rotating pattern, or a collision pattern.

20. A motion control apparatus for providing a realistic effect to a viewer of multimedia contents, the apparatus comprising:

an input interface configured to obtain a motion control input including an x-axis input, a y-axis input, a z-axis input, a roll input, a yaw input, and a pitch input for controlling a locus of a chair on which the viewer sits;

a pattern selector configured to select at least one similar motion pattern similar to the motion control input from a plurality of predefined motion patterns based on a result of comparing the motion control input with the plurality of predefined motion patterns; and a motion controller configured to control a seat on which the viewer sits based on the at least one similar motion pattern.

* * * * *